United States Patent
Beranek et al.

(10) Patent No.: US 10,641,960 B1
(45) Date of Patent: May 5, 2020

(54) METHOD AND APPARATUS FOR ASSEMBLING A FIBER OPTIC SPLICE

(71) Applicant: United States of America, as represented by the Secretary of the Navy, Patuxent River, MD (US)

(72) Inventors: Mark Beranek, Hollywood, MD (US); Nicholas Peterson, Minneapolis, MN (US); Bradley Yost, Mechanicsville, MD (US); Michael Block, St. Leonard, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/151,992

(22) Filed: Oct. 4, 2018

(51) Int. Cl.
*G02B 6/25* (2006.01)
(52) U.S. Cl.
CPC ..................................... *G02B 6/25* (2013.01)
(58) Field of Classification Search
None
See application file for complete search history.

(56) References Cited

U.S. PATENT DOCUMENTS

| | | | |
|---|---|---|---|
| 6,439,782 B1* | 8/2002 | Otani ................... | G02B 6/2551 385/96 |
| 7,306,382 B2 | 12/2007 | Qian et al. | |
| 7,410,308 B2 | 8/2008 | Qian et al. | |
| 7,494,288 B2* | 2/2009 | Ozawa ................. | G02B 6/2551 385/96 |
| 8,103,144 B1 | 1/2012 | Zhao et al. | |
| 2015/0185419 A1* | 7/2015 | Kawanishi ........... | G02B 6/2558 385/96 |

\* cited by examiner

*Primary Examiner* — Tina M Wong
(74) *Attorney, Agent, or Firm* — Olivia Scheuer; NAWCAD (57) ABSTRACT

A method and apparatus for assembling a fiber optic splice is provided. A first optical fiber end is inserted into a first clamp of the apparatus and a second optical fiber end is inserted into a second clamp of the apparatus. Situated between the first clamp and the second clamp is a curing chamber comprising a capillary tube containing resin and an ultra violet light. The first clamp moves a first distance, based on a first measured strain, towards the curing chamber. The second clamp is moved a second distance, based on a second measured strain, towards the curing chamber. The first clamp is then moved a third distance, based on a third measured strain, towards the curing chamber. The ultraviolet light is activated to cure the resin in the capillary tube.

6 Claims, 6 Drawing Sheets

METHOD AND APPARATUS FOR ASSEMBLING A FIBER OPTIC SPLICE

STATEMENT OF GOVERNMENT INTEREST

The invention described herein may be manufactured and used by or for the Government of the United States of America for governmental purposes without payment of any royalties thereon or therefor.

BACKGROUND

Optical fiber is a flexible, transparent fiber made of silica or plastic. Optical fiber has become a valuable component of electronic devices, as it permits for longer transmission distances and higher bandwidth than cable wires. Despite the many benefits of optical fiber, one of the main drawbacks is the fragility of the fiber, as compared to cable wires. Optical fiber can be used in a number of applications, including as a medium for telecommunication and computer networking, sensor applications, and power transmission. As the number of applications increase, there is a growing demand for mechanisms of repairing optical fiber. Existing mechanisms for repairing optical fiber include fusion splicing and mechanical splicing.

Fusion splicing is the act of joining two optical fibers end-to-end using heat (e.g., electric arc, laser, gas flame, etc.). One goal of fusion splicing is to fuse the two fibers together in such a way that light passing through the fibers is not scattered or reflected back by the splice. Another goal of fusion splicing is to create a splice and surrounding region that are almost as strong as the original fiber itself. Fusion splicing is a widely accepted form of repairing optical fiber; however, fusion splicing cannot be used in many situations. In applications that are sensitive to heat, such as environments with electronic components, fusion splicing may not be a viable option. Fusion splicing can also be problematic in explosive environments. For example, a fueled aircraft could have an increased chance of explosion due to combustible fumes in the vicinity of the splice.

Existing mechanisms for mechanical fiber splices are designed to be quicker and easier to install than fusion splicing; but, there is still the need for stripping, careful cleaning and precision cleaving of the optical fibers. The fiber ends are aligned and held together by a sleeve, often using a clear index-matching material that enhances the transmission of light across the joint. Such joints typically have higher optical loss and are less robust than fusion splices, especially where imperfect contact is made between the two optical fiber ends within the resin.

SUMMARY

In general, in one aspect, an apparatus for splicing an optical fiber, the apparatus comprising: a first clamp movably secured to a casing, wherein the first clamp retains a first optical fiber end and wherein the first clamp moves along a first plane; a second clamp movably secured to the casing, wherein the second clamp retains a second optical fiber end and wherein the second clamp moves along the first plane; a curing chamber secured to the casing, wherein the curing chamber is situated between the first clamp and the second clamp on the first plane and wherein the curing chamber retains a capillary tube; wherein the casing comprises a microcontroller and a plurality of motors.

In general, in another aspect, a method of splicing optical fiber, the method comprising: preparing a first optical fiber end and a second optical fiber end; in response to a used interaction with an actuator, inserting, by a first motor assembly, the first prepared optical fiber end a first distance into a capillary, wherein the capillary comprises a resin; inserting, by a second motor assembly, the second prepared optical fiber end a second distance into the capillary; moving, by the first motor assembly, the first prepared optical fiber end a third distance in the capillary wherein the third distance is determined, at least in part, by a force measurement; and activating an ultraviolet light, such that the ultraviolet light cures the resin.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

DETAILED DESCRIPTION

An embodiment of the present invention recognizes that optical fiber is often used in sensitive environments. In some of these sensitive environments, the use of high temperature—such as the temperature needed for fusion splicing—can damage components surrounding the optical fiber. Potential damage from heat creates a need for mechanical splicing of optical fiber that can be done quickly and efficiently. Fusion splicing can pose explosive hazards when used in environments containing combustible fumes. Further, in some circumstances, certain strength or durability standards must be met before the repaired optical fiber can be used in an application. For example, government and aviation standards must be met for all optical fibers used on in aviation environments. Many of these standards require a threshold durability and/or reliability be satisfied prior to the optical fiber being utilized for optical communications. Therefore, embodiments of the present invention recognize a need for a means to splice optical fiber while maintaining the reliability and robustness of the original fiber.

In the following description of the present invention, reference will be made to various embodiments which are not all inclusive. The current invention can be implemented in various forms. However, example embodiments of the present invention are illustrated below and in FIGS. 1 through 6.

Figure 1:
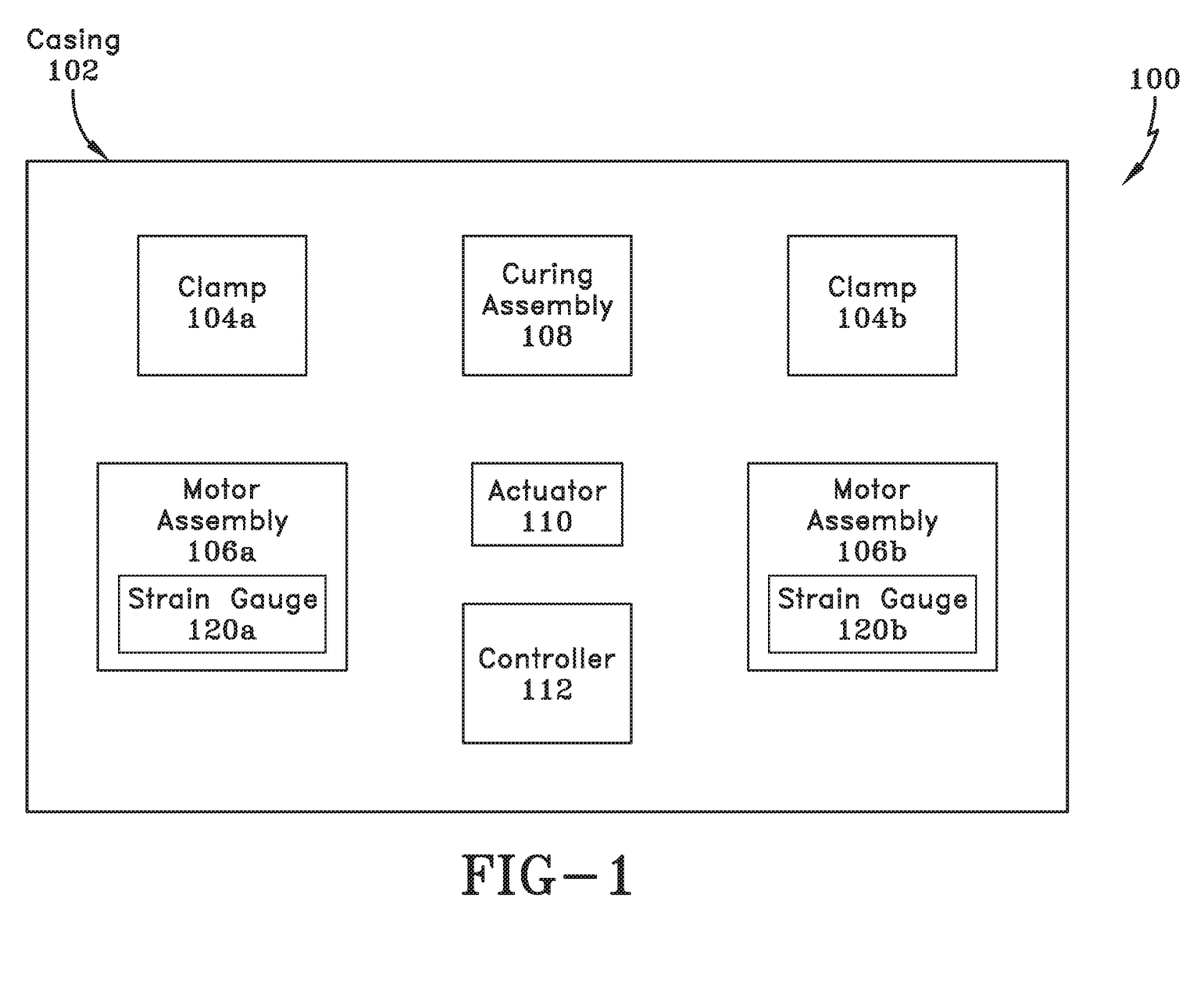
FIG. 1 is a block diagram of the fiber optic splice apparatus.

FIG. 1 is a block diagram of a fiber optic splice apparatus. Fiber optic splice apparatus 100 is an electromechanical device used to splice two ends of optical fiber. Fiber optic splice apparatus 100 comprises casing 102, clamps 104a and 104b, motor assemblies 106a and 106b, curing assembly 108, actuator 110, and controller 112. In some embodiments, fiber optic splice apparatus 100 may comprise more components. For example, fiber optic splice apparatus 100 may comprise a power source (not shown).

Casing 102 houses each of the other components of fiber optic splice apparatus 100. In various embodiments, the material and shape of casing 102 may vary greatly. In some embodiments, casing 102 secures motor assemblies 106a and 106b, actuator 110, and controller 112 from environmental factors. In some embodiments, the shape of casing 102 is optimized for mobile use. For example, the shape of casing 102 may comprise a handle and one or more ergonomically placed buttons. In many embodiments, casing 102 is compact to provide portability.

Clamps 104a and 104b each hold a fiber optic end, which are to be spliced together. Clamp 104a is situated in a parallel position to clamp 104b, in the same plane, such that they move toward and away from each other in a single plane. In some embodiments, clamps 104a and 104b are mechanical, such that a user loosens and tightens the clamps to, respectively, remove or secure the fiber optic ends. In other embodiments, clamps 104a and 104b are automatic, such that the clamp 104a or 104b loosens and tightens is response to a signal from controller 112.

Motor assemblies 106a and 106b are attached to clamps 104a and 104b, respectively. Motor assemblies 106a and 106b cause clamps 104a and 104b to move laterally in the same plane. Motor assembly 106a and 106b each receive signals from controller 112 in response to measurements from strain gauges 120a and 120b. Strain gauges 120a and 102b are utilized to measure an initial and terminal resistance when either motor assembly 106a or 106b are moving.

Figure 3:
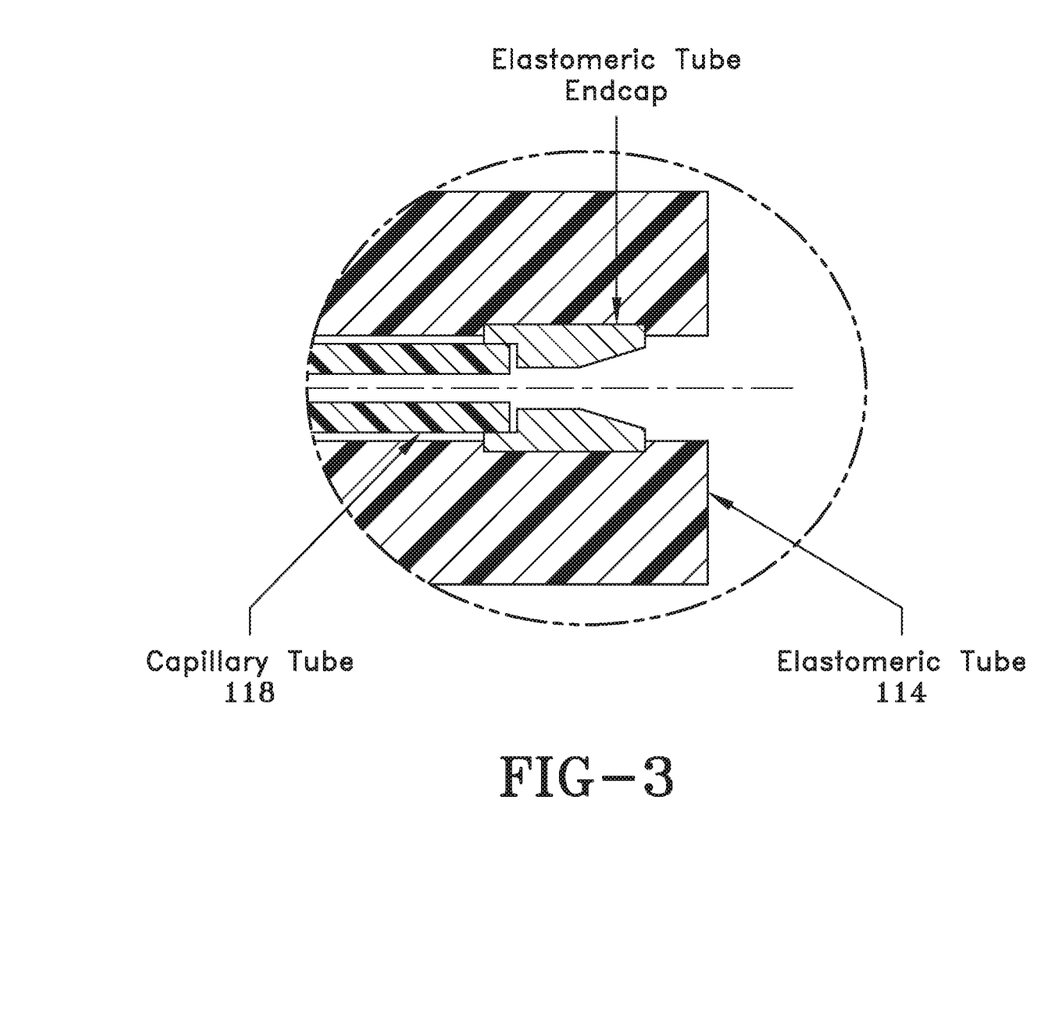
FIG. 3 is a diagram of the elastomeric tube.

Curing assembly 108 comprises an elastomeric tube 114 and an ultraviolet light assembly. A capillary tube 118 can be removeably secured within curing assembly 108. Capillary tube 118 is filled with a resin that hardens when exposed to the light from ultraviolet light assembly. The elastomeric tube 114 is shaped to hold capillary tube 118. For example, the inner diameter of elastomeric tube 114 is sized based on the outer diameter of capillary tube 118, such that capillary tube 118 is firmly secured within curing assembly 108. In some embodiments, elastomeric tube 114 is shaped to guide optical fiber ends into capillary tube 118. For example, the inner wall of each end of elastomeric tube 114 may have a tapered frustoconical shape, such that the opening of elastomeric tube 114 is measurably larger than outer diameter of capillary tube 118. In this example, the inner diameter of elastomeric tube 114 gradually decreases until the diameter of the inner wall of elastomeric tube 114 matches that of the outer diameter of capillary tube 118. FIG. 3, discussed within, describes the shape of elastomeric tube 114 in more detail.

In some embodiments, curing assembly 108 contains a photodetector (not shown). The photodetector measures the intensity of ultraviolet light from ultraviolet light assembly (not shown). In some embodiments, the photodetector measurements are used to determine the length of time ultraviolet light assembly is activated. In other embodiments, ultraviolet light assembly is activated for a predetermined length of time. In some embodiments, the photodetector is used to calibrate ultraviolet light assembly. For example, the photodetector may be used to determine the frequency of light being emitted from ultraviolet light assembly. In another embodiment, the photodetector may be used to ensure that ultraviolet light is reaching the entire span of capillary tube 118.

Actuator 110 is used to begin the optical fiber splicing steps. In some embodiments, actuator 110 is a button or switch capable of receiving a user interaction and transmitting a signal to controller 112. In response, controller 112 sends a signal to move motor assembly 106a and 106b. Controller 112 receives inputs from strain gauge sensors within motor assembly 106a and 106b. Controller 112 uses the strain gauge inputs and predefined strain thresholds to determine when to start and stop motor assemblies 106a and 106b. Controller 112 sends a signal to control the movement of motor assemblies 106a and 106b. In various embodiments, controller 112 is a computing device. Controller 112, through a computing program, operates the movement of motor assemblies 106a and 106b via actuator 110.

Figure 2:
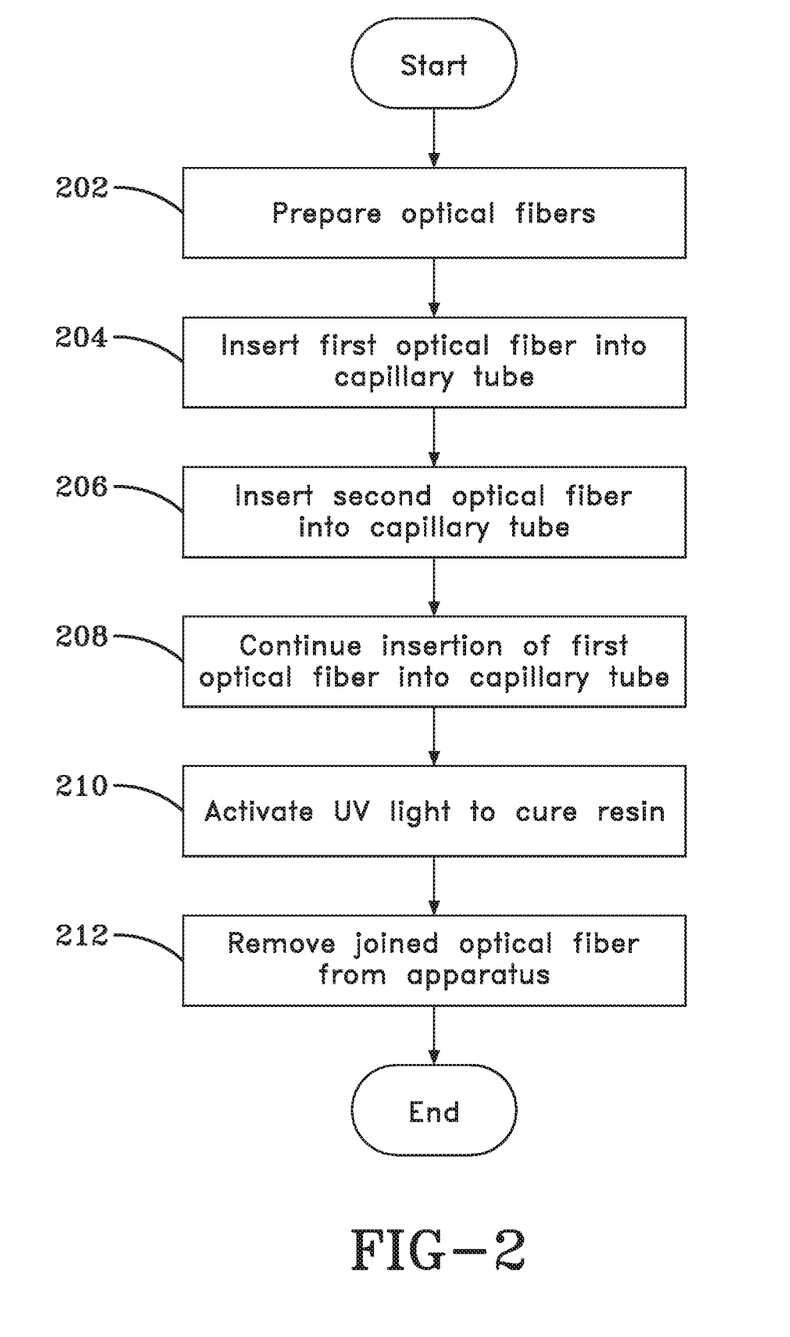
FIG. 2 is a flow chart depicting a method for splicing an optical fiber.

Turning now to FIG. 2, the method for splicing an optical fiber is described. One skilled in the art will recognize that functions described in the block diagram may occur out of the order noted in the figures. For example, two blocks shown in succession may, if fact, be executed substantially concurrently, depending upon the functionality involved.

In step 202, the optical fiber is prepared for splicing. Optical fiber often comprises a number of coatings surrounding the silica or plastic fiber. In some embodiments, to fix a broken optical fiber, the optical fiber is cleaved, leaving a portion of the fiber exposed with no coatings. The length of the portion of exposed fiber may vary, based on the preparation. However, in some embodiments, the length of the cleaved portion should be equal to half the length of capillary tube 118. This will allow capillary tube 118 to cover any exposed portion of the two ends of optical fiber. In other embodiments, the plastic or silica fiber has a polyimide coating, which are difficult to strip in sensitive environments as they require hot acid and/or electric arcs or flames. In these embodiments, the ends of the fiber may be polished to ensure a clean connection between the two spliced fibers.

In some embodiments, once each of the optical fiber ends have been cleaved or polished, a metal sleeve is placed over a portion of the optical fiber end. In this embodiment, a portion of the metal sleeve covers a portion of the protective coating as well as a portion of the exposed optical fiber. The metal sleeve provides rigidity to improve the robustness of a spliced optical fiber. The preparation of the optical fiber end is shown in more detail within, referencing FIG. 4.

In step 204, the first optical fiber end is inserted into capillary tube 118. In response to a user engaging actuator 110, motor assembly 106a moves clamp 104a towards curing assembly 108. As motor assembly 106a moves clamp 104a, controller 112 receives a signal from strain gauge 120a, measuring the strain at the end of the first optical fiber end. In response to a predefined strain measurement, motor assembly 106a continues to move clamp 104a a first predefined distance and then stops. The predefined strain measurement is based on the strain caused by the first optical fiber end protruding the resin filled capillary tube 118.

In step 206, the second optical fiber end is inserted into capillary tube 118. In response to the first motor assembly 106a stopping in step 204, motor assembly 106b moves clamp 104b towards curing assembly 108. As motor assembly 106b moves clamp 104b, controller 112 receives a signal from the strain gauge 120b, measuring the strain at the end of the second optical fiber end. In response to a predefined strain measurement, motor assembly 106b continues to move clamp 104b a predefined distance and then stops. The predefined strain measurement is caused by the second optical fiber end protruding the resin filled capillary tube 118. The predefined distance is equal to half the length of capillary tube 118.

Figure 5:
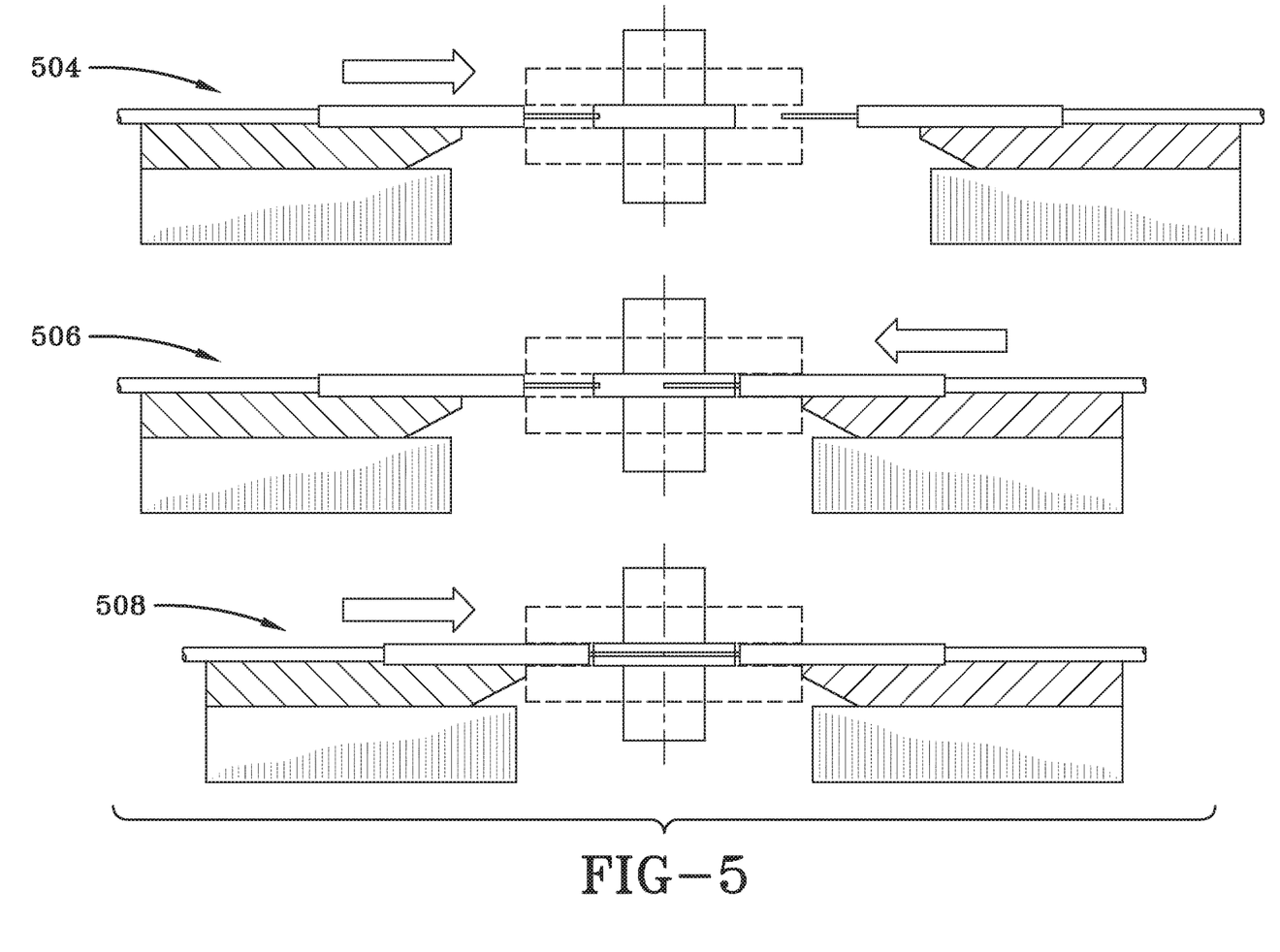
FIG. 5 is a diagram of the fiber insertion into the capillary tube sequence.

In step 208, the first optical fiber end is further inserted into capillary tube 118, causing a connection between the first optical fiber end and the second optical fiber end. In response to the second motor assembly 106b stopping in step 208, motor assembly 106a moves clamp 104a toward curing assembly 108. In some embodiments, motor assembly 106a moves clamp 104a a predefined distance. In this embodiment, the predefined distance is equal to half the length of capillary tube 118 minus the first predefined distance. In another embodiment, motor assembly 106a moves clamp 104a until a defined strain is measured by the strain gauge. In this embodiment, the strain is caused by the first optical fiber end contacting the second optical fiber end within capillary tube 118. A visual representation of one embodiment of steps 204 through 208 is shown in FIG. 5, discussed within.

In step 210, the UV light is activated to cure the resin in capillary tube 118. In response to both optical fiber ends being inserted into capillary tube 118, the UV light is activated. In some embodiments, the activation is automatic after the completion of step 208. In other embodiments, the activation is a response to a user interaction with actuator 110. In some embodiments, the UV light is activated for a predetermined amount of time. In these embodiments, the time is calculated based on the curing rate of the resin in capillary tube 118. In other embodiments, the UV light is activated until the light intensity monitor measures a predetermined value. For example, while the resin is uncured it allows a certain percentage of light to pass through; whereas, when the resin is cured a different percentage of light is able to pass through. In this example, the UV light is activated until the cured resin light measurement is measured by the intensity monitor.

In step 212, the spliced optical fiber is removed from the apparatus. In some embodiments, the user must manually release the optical fibers from clamps 104a and 104b. In other embodiments, clamps 104a and 104b automatically release the optical fibers in response to the UV light being inactivated.

Turning now to FIG. 3, a diagram depicting the elastomeric tube is provided. Elastomeric tube 114 houses capillary tube 118. Elastomeric tube 114 is sized to securely hold capillary tube 118. For example, the inside diameter of elastomeric tube 114 is sized to match that of the outside diameter of capillary tube 118. In some embodiments, elastomeric tube 114 has notches at each end, which may prevent capillary tube 118 from moving laterally within curing assembly 108. As seen in the diagram, elastomeric tube 114 has an inner wall that is tapered at each end and has a frustoconical shape from the tapered end to the opening of capillary tube 118. In some embodiments, the frustoconical shape and the notch are created by an endcap, which is inserted into elastomeric tube 114. In other embodiments, the frustoconical shape is integrated into elastomeric tube 114 during manufacture. In some embodiments, the frustoconical shape acts as a guide to the optical fiber. For example, should the optical fiber hit the inner wall of elastomeric tube 114 upon insertion (e.g., step 204, step 206, or step 208), the shape of the wall will act as a guide towards the capillary tube 118. The frustoconical shape prevents the optical fiber from hitting a blunt sidewall, lessening the chances of damaging the optical fiber end.

Figure 4:
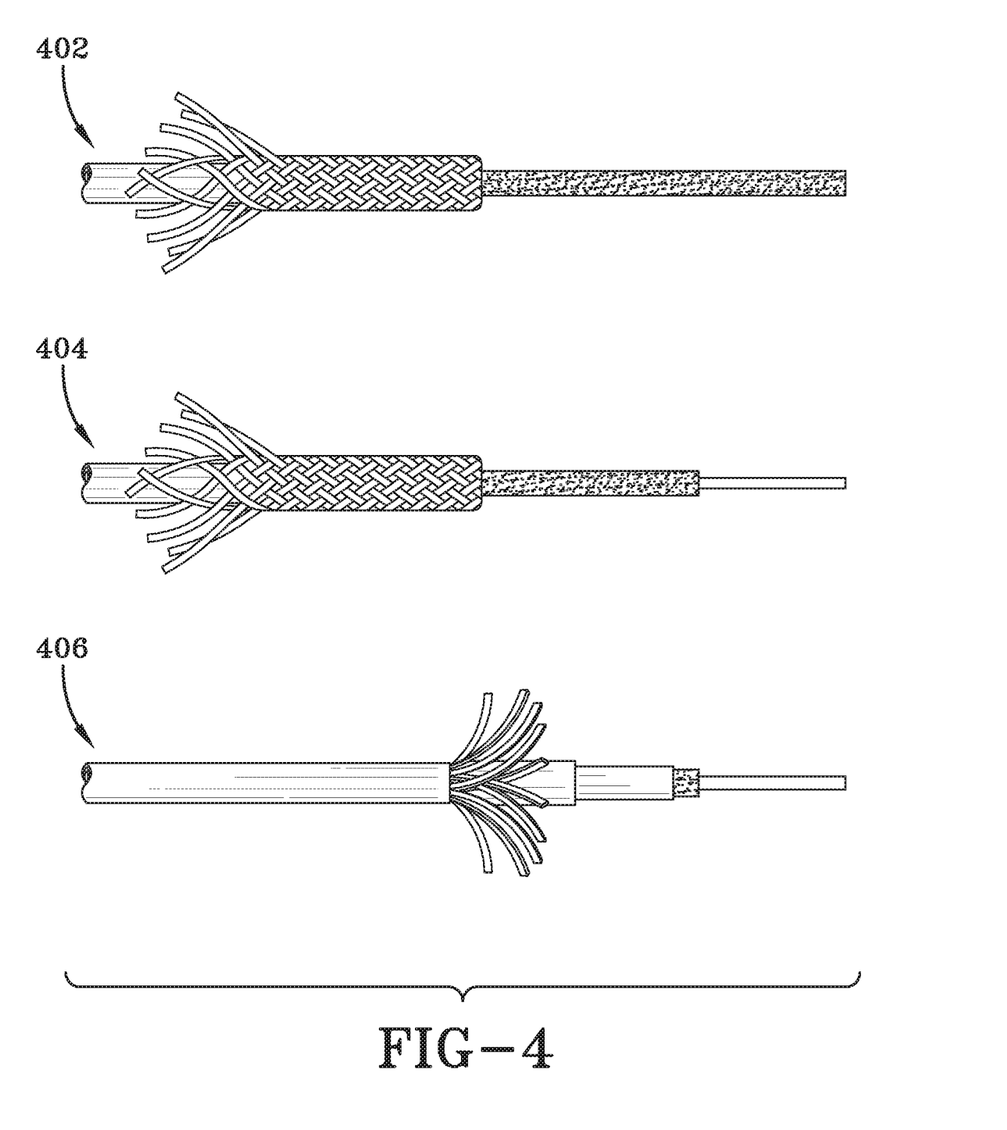
FIG. 4 is a diagram of the optical fiber preparation sequence.

FIG. 4 is a diagram depicting an embodiment of the optical fiber preparation sequence. Step 402 depicts an embodiment of an optical fiber end prior to preparation. Step 404 depicts an embodiment of the optical fiber end after the protective coating has been removed from a portion the optical fiber end. Step 406 depicts an embodiment of the optical fiber with the metal casing applied.

FIG. 5 depicts the sequence for inserting the optical fibers into the capillary tube. Step 504 shows the first optical fiber after it has been inserted a first distance into capillary tube 118. The insertion of the optical fiber in step 504 creates a damming effect, allowing the resin in capillary tube 118 to seep out in a reproducible manner. Step 504 is the result of step 204. Step 506 shows the second optical fiber inserted into capillary tube 118. Step 506 is the result of step 206. Step 508 depicts the optical fibers after the first optical fiber has been inserted into capillary tube 118 a second distance. Step 508 is a result of step 208. The damming effect created in step 504 allows resin, displaced by the optical fiber to seep back toward the opening of capillary tube 118. The advantage of following steps in FIG. 5, as depicted, is lessening the chance of air bubbles forming between the two optical fibers in capillary tube 118. The three step process of inserting the optical fiber ends into capillary tube 118 allows the excess resin to seep out, in a reproducible manner, during step 208. As a result, there is a cleaner connection between the two optical fiber ends.

Figure 6:
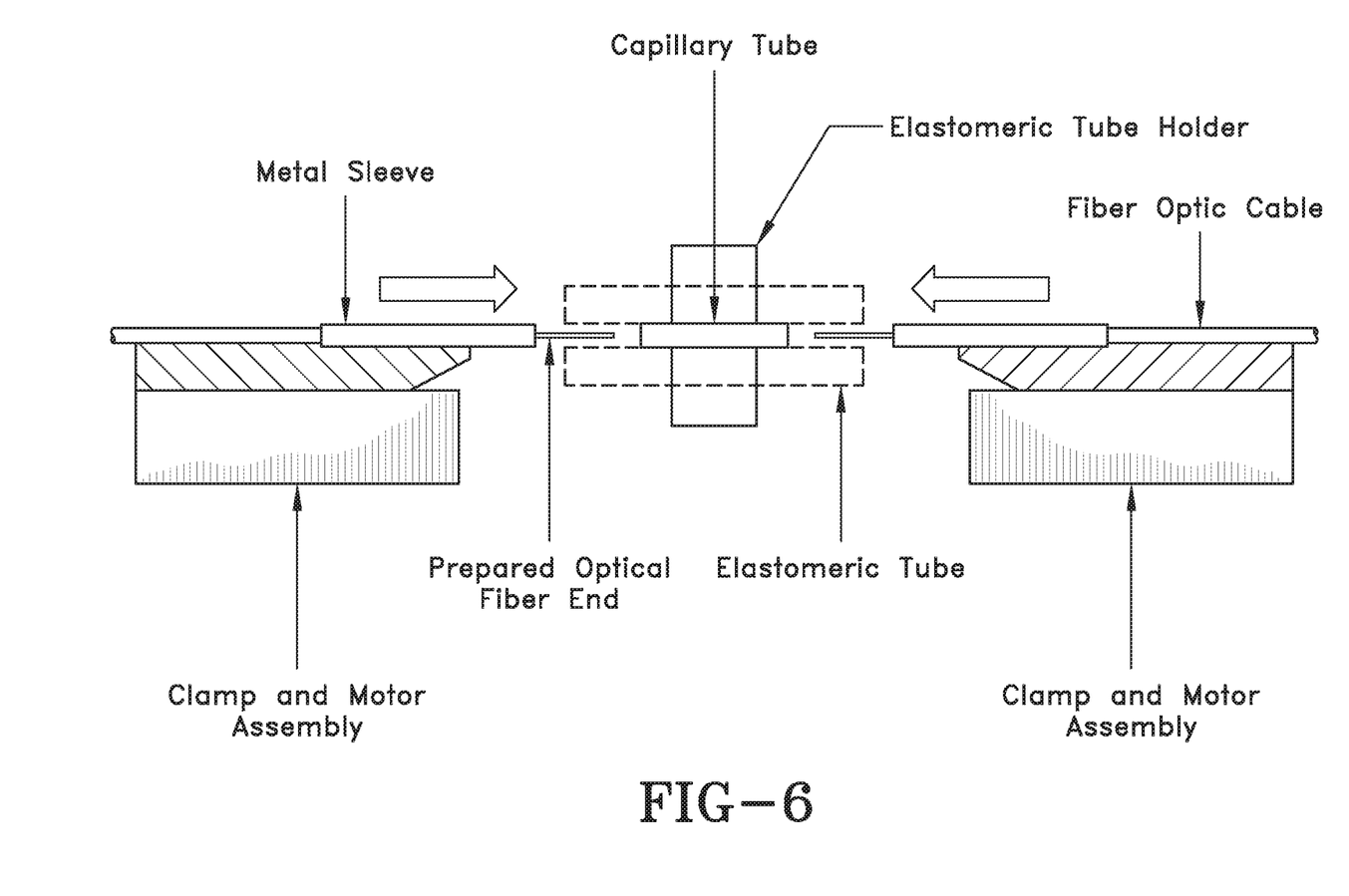
FIG. 6 is a cross-sectional view of an embodiment of the apparatus.

FIG. 6 is a cross-sectional view of one embodiment of the apparatus of the present invention. As shown clamps 104a and 104b hold the optical fiber ends. The ends have been prepared with the metal sleeve, leaving the end portion free of any coatings. Elastomeric tube 114 is held in place by an elastomeric tube holder. Further, capillary tube 118 is held within elastomeric tube 114. Clamps 104a and 104b slide towards and away from elastomeric tube 114, allowing the optical fiber ends to be inserted into capillary tube 118 for splicing.

The above description is that of current embodiments of the invention. Various alterations and changes can be made without departing from the spirit and broader aspects of the invention as defined in the appended claims.

What is claimed is:

1. An apparatus for splicing an optical fiber, the apparatus comprising:
 a first clamp movably secured to a casing, wherein the first clamp retains a first optical fiber end and wherein the first clamp moves along a first plane;
 a second clamp movably secured to the casing, wherein the second clamp retains a second optical fiber end and wherein the second clamp moves along the first plane;
 a curing chamber secured to the casing, wherein the curing chamber is situated between the first clamp and the second clamp on the first plane and wherein the curing chamber retains a capillary tube;
 wherein the casing comprises a microcontroller and a plurality of motors, wherein the plurality of motors move the first clamp and the second clamp based on one or more signals from the microcontroller.

2. The apparatus of claim 1, further comprising:
 a first strain gauge attached to the first clamp, wherein the first strain gauge measures a force applied to the first optical fiber end.

3. The apparatus of claim 2, further comprising:
 a second strain gauge attached to the second clamp, wherein the second strain gauge measures a force applied to the second optical fiber end.

4. The apparatus of claim 1, wherein the curing chamber comprises:

an elastomeric tube, wherein the elastomeric tube is holds the capillary tube; and an ultra violet light for curing a resin in the capillary tube.

5. The apparatus of claim 4, wherein the elastomeric tube comprises two ends, an inner wall and an outer wall, wherein the outer wall has a uniform diameter, wherein the inner wall at each of the two ends has a tapered frustoconical shape, such that the diameter of the inner wall between the tapered frustoconical shapes is sized based on an outside diameter of the capillary tube.

6. The apparatus of claim 1, wherein the curing chamber comprises an ultraviolet light.

* * * * *